United States Patent [19]
Antcliff et al.

[11] Patent Number: 6,081,835
[45] Date of Patent: Jun. 27, 2000

[54] INTERNET SERVER AND METHOD OF CONTROLLING AN INTERNET SERVER

[75] Inventors: Stuart J. Antcliff; John C. Regnault; Laurence D. Bradley, all of Suffolk, United Kingdom

[73] Assignee: British Telecommunications public limited company, London, United Kingdom

[21] Appl. No.: 08/815,468

[22] Filed: Mar. 11, 1997

Related U.S. Application Data

[63] Continuation-in-part of application No. 08/684,257, Jul. 19, 1996, abandoned.

[30] Foreign Application Priority Data

Apr. 4, 1996 [GB] United Kingdom .................. 9607152

[51] Int. Cl.[7] .............................. G06F 13/33; G06F 15/17
[52] U.S. Cl. ........................................... 709/217; 709/229
[58] Field of Search .................................... 709/217, 218, 709/219, 203, 229; 707/501, 513

[56] References Cited

U.S. PATENT DOCUMENTS

| | | |
|---|---|---|
| 5,530,852 | 6/1996 | Meske, Jr. et al. . |
| 5,572,643 | 11/1996 | Judson . |
| 5,678,041 | 10/1997 | Baker et al. . |
| 5,712,979 | 1/1998 | Graber et al. . |
| 5,717,860 | 2/1998 | Graber et al. . |

FOREIGN PATENT DOCUMENTS

| | | |
|---|---|---|
| WO 97/11429 | 3/1997 | WIPO . |
| WO 97/11430 | 3/1997 | WIPO . |

OTHER PUBLICATIONS

Lewontin, "The DCE Web Toolkit: Enhancing WWW Protocols with Lower–Layer Services", Computer Networks and ISDN Systems, vol. 27, No. 6, Apr. 1, 1995, pp. 765–771.

http://home.netscape.com/newsref/std/cookie_spec.html, "Persistent Client State HTTP Cookies", Feb. 9, 1998, pp. 1–5.

draft–kristol–http–state–mgmt–00.ps, "Proposed HTTP Statement Management Mechanism", Feb. 22, 1996, pp. 1–11.

http://www.w3.org/Protocols/HTTP/HTRQ_Headers.html, "HTTP Request Fields", Feb. 10, 1998, pp. 1–5.

Brown, "Using Netscape 2" Second Edition, Chapter 16, pp. 407–410.

(List continued on next page.)

*Primary Examiner*—Mark H. Rinehart
*Attorney, Agent, or Firm*—Nixon & Vanderhye P.C.

[57] ABSTRACT

An internet server is controlled wherein the server receives a hypertext transfer protocol file request from a web browser over the internet and any identification signal included with the hypertext transfer protocol file request. The identification signal is compared with one or more predetermined identification signals and depending upon the result of the comparison a file may be transmitted from the server to the web browser.

18 Claims, 7 Drawing Sheets

OTHER PUBLICATIONS

Weinman, The CGI Book, Mar. 1, 1996, pp. 117–120; pp. 203–208.

Voelker et al, "MObisaic: An Information System for a Mobile Wireless Computing Environment", Proceedings, Workshop on Mobile Computing Systems and Applications (Cat. No. 94TH06734), Workshop on Mobile Computing Systems and Applications, Santa Cruz, CA, USA, Dec. 8–9, 1994, ISBN 0–8186–6345–6, 1995, Los Alamitos, CA., USA, IEEE Comut. Soc. Press. USA, pp. 185–190, XP002013678.

Chu et al., "Creating a Hypertext Markup Language Document for an Information Server", 24th Annual Meeting of the Society for Computers in Psychology (SCIP), St. Louis, MO, USA, Nov. 10, 1994, vol. 27, No. 2, ISSN 0743–3808, Behavior Research Methods, Instruments, & Computers, May 1995, USA, pp. 200–205, XP000567305.

Schulzrinne, "World Wide Web: Whence, Whither, What Next?", IEEE Network, Mar.–Apr. 1996, IEEE Network, Mar.–Apr. 1996, vol. 10, No. 2, ISSN 0890–8044, pp. 10–17, XP000580078.

Leone et al, "Towards a User Environment Integrating Hypermedia Browers, Scientific Visualization Programs and Numerical Simulation Programs", Proceedings of the Workshop on Advanced Visual Interfaces AVI '94, Proceedings of the Workshop on Advanced Visual Interfaces AVI, Bari, Italy, Jun. 1–4, 1994, ISBN 0–08791–733–2, 1994, New York, NY, USA, ACM, USA, pp. 234–236, XP000571293.

Fig.6 ns
INTERNET SERVER AND METHOD OF CONTROLLING AN INTERNET SERVER

RELATED APPLICATION

This application is a continuation-in-part of our earlier commonly assigned U.S. application Ser. No. 08/684,257 filed Jul. 19,1996, now abandoned.

BACKGROUND OF THE INVENTION

1. Field of the Invention

The present invention relates to an internet server and method of controlling the internet server.

2. Related Art

Figure 1:
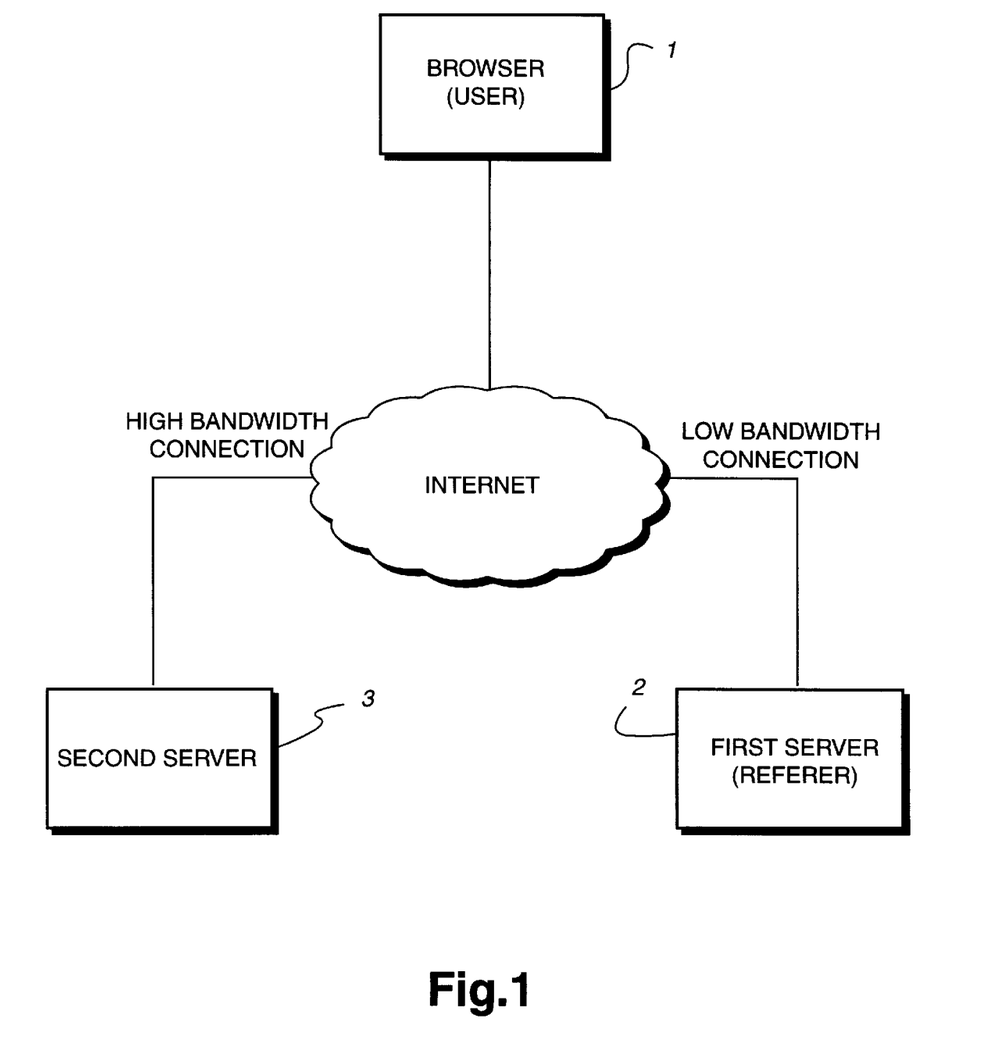
FIG. 1 is a schematic drawing of the interconnection of a browser with servers over the internet.

The internet has developed rapidly over the past few years and has resulted in increased traffic over telecommunications networks. One particular factor which has made the internet more 'user friendly' is the development of the World Wide Web (WWW) service which uses the HyperText Transfer Protocol (HTTP) specification. In order to utilise the WWW service, the user will utilize what is termed a browser, which is software which can interpret hypertext mark-up language (HTML) files which are sent from an internet WWW server to create a web page on the screen of the user's computer. FIG. 1 illustrates a typical internet configuration wherein a user is connected to the internet and uses the WWW service using a browser 1.

In order to initiate the generation of a web page, i.e. to connect to a WWW server such as first server 2, which has a low storage and processor capacity and is linked to the internet via a low bandwidth connection, a request for an HTML file must be transmitted by the browser 1 to the WWW server 2. In order to identify and locate a file in a server from amongst the servers connected to the internet, the file is identified by a universal resource locator (URL). The URL is structured to identify the protocol (which in this case is HTTP), the internet server, the directory of the file in the internet server and the file name. Thus the URL structure is:

http://internet server/directory/file name

When a URL is selected by a user, the browser 1 transmits a file request over the internet to the first server 2 which has the address identified in the URL of the file requested in a HTML file. The first server 2 will then send the HTML file to the browser 1. The browser 1 then interprets the HTML file in order to generate a web page.

The HTML specification allows for text to be displayed and for hypertext links to be included in the web page. Also, the HTML protocol allows graphics or image files to be included in the web page displayed by the browser 1. The HTML protocol thus allows for image files which are to be displayed by the browser 1 to be identified by their URL. When the browser 1 interprets the HTML file returned from the first server 2, if the HTML file includes image URL's, the browser 1 will seek to retrieve the image files using the URL of the image file. Thus, the image or graphics files are retrieved separately to the HTML file and when a web page is displayed by the browser 1, the graphics included in the web page can take longer to display as the file is retrieved after the HTML file.

Since the image file required to complete the web page is identified by a URL there is no requirement for the image file to be located at the first server 2 which supplied the HTML file. Because image or graphics files can be quite large files, the transmission of such files over the internet can take a significant period of time when transmitted over a route with a relatively limited data rate. The ability of a browser 1 to locate and retrieve image or graphics files which are referred to in the web page and which are located anywhere in the internet, allows an internet server providing web pages to utilize this to avoid having to store image or graphics files required to complete the web page created by the HTML file. Further, such a first server can be connected to the internet over a low bandwidth connection without risking a bottleneck. A second server 3 in the internet which has a high storage and processor capacity which hosts the graphics or image files referred to in the web page is thus the subject of bandwidth-consuming graphic file requests from the browser. Such a second server 3 can for instance be an internet server which is connected to the internet over a high bandwidth connection.

Figure 2:
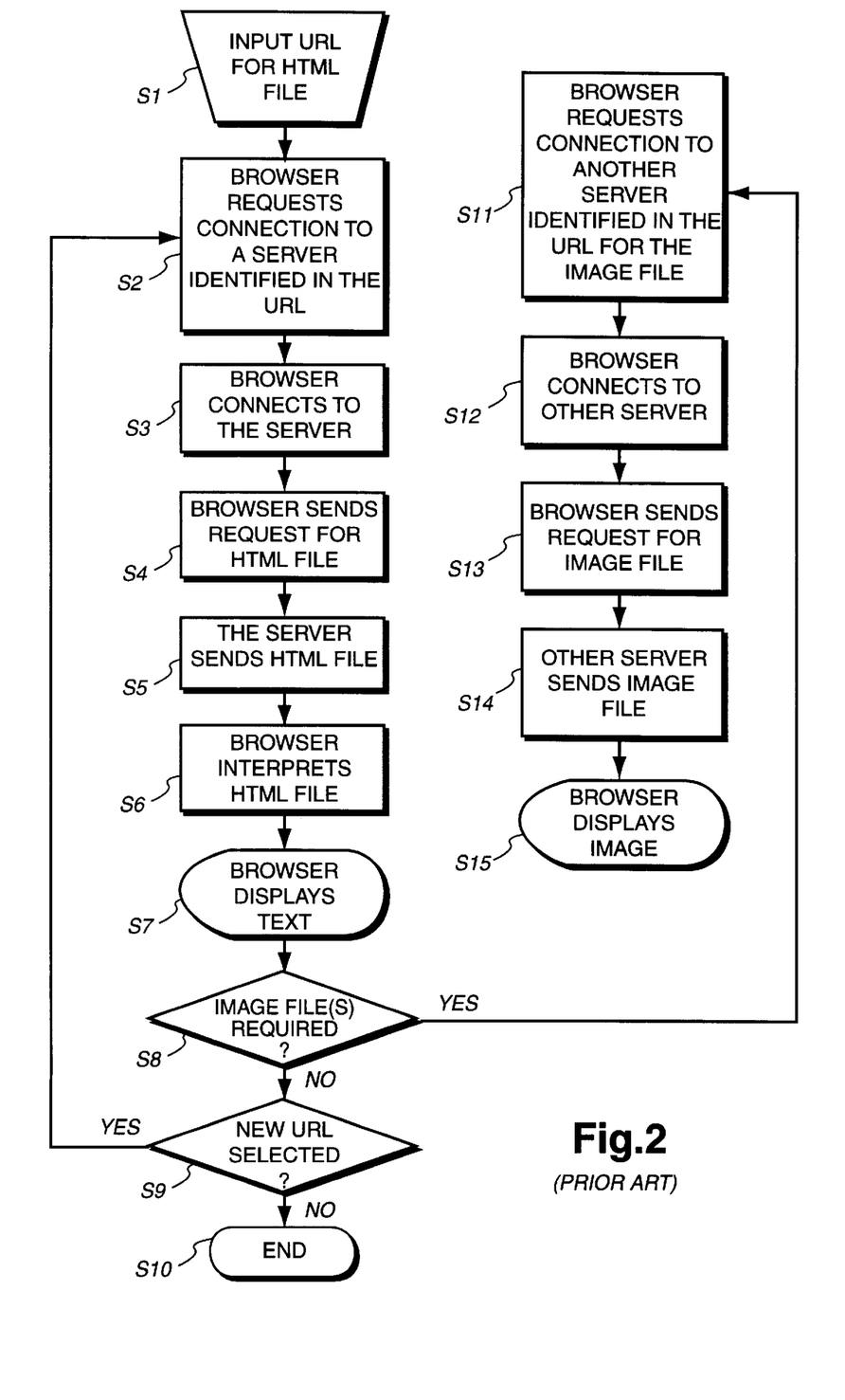
FIG. 2 is a flow diagram illustrating the operation of the browser and the servers in accordance with the prior art.

FIG. 2 illustrates in more detail a method of operation when such a system of referring to graphics pages at another server is used.

When the browser 1 is initialised, a URL for an HTML file is input or selected by a user in step S1. The browser then requests connection to the server identified in the URL in step S2 and in step S3 the browser connects to the server. The browser then sends a request for the HTML file in step S4 and in step S5 the server sends the HTML file which is then interpreted by the browser in step S6. The web page generated by the interpretation of the HTML file is then displayed in step S7. At this point the web page will include only the text and the hypertext links. In step S8 the browser determines whether the HTML file refers to any image URLs. If not, the browser will await to determine whether any URL is selected for instance using the hypertext links in step S9. If a new URL is selected in step S9 the browser returns to step S2 to request a connection to the same or another server. If no new URL is selected the browser will end requesting files in step S10. If in step S8 it is determined that the HTML file refers to image or graphics URLs, in step S11 the browser requests connection to the second server 3 (or other servers) identified in the URL of the image file. In step S12 the browser connects to the second server 3 (or other servers) and in step S13 the browser 1 sends a request for the image file. The second server 3 then sends the requested image file in step S14 and in step S15 the browser displays the image file within the web page. Step S8 and steps Sl1 to S15 will be carried out simultaneously to retrieve as many image files as are required, i.e. referred to in the HTML file, in order to complete the web page.

It will be seen from the above that the ability of the HTML protocol to allow an HTML file to refer to image files at any server connected to the internet using the URL, allows the first server 2 to make use of image or graphics files in the second server 3 thus reducing the cost of storage at the first server 2. The first server requires less processing time and less bandwidth to deliver the complete web page to the browser 1. Also, the development of web pages by the operator of the first server 2 is easier and cheaper, since there is no need for the operator to create custom artwork. They are simply able to use images available on other servers.

SUMMARY OF THE INVENTION

In accordance with one aspect, the present invention provides a method of controlling a server connected to the internet, comprising the steps of receiving a file request;

determining if the file request includes an identification signal identifying the originating file from which said request originated;

comparing any said identification signal with one or more predetermined identification signals; and deciding what file if any is to be transmitted to said user in dependence upon said determining and comparing steps, and if in the deciding step it is decided that a file is to be transmitted, transmitting said file from said server to said user.

The present invention therefore allows the control of access to image or graphics files, or any other high bandwidth files such as digitized sounds or movies.

The file request may be a hypertext transfer protocol file request from a web browser over the internet and the identification signal may identify a web page from which the file request was made. The file to be transmitted is then transmitted to the web browser of the user.

In a preferred embodiment, the file sent to a user may be customised by a server, thus customising the web page displayed by a user's browser, in dependence upon the route taken in arriving at the web page to be displayed i.e. in dependence upon the previous web page.

In accordance with a second aspect, the present invention provides an internet server for connection to the internet comprising receiver means for receiving a file request;

determining means for determining if the file requested includes an identification signal identifying the originating file from which said request originated;

comparison means for comparing any said identification signal with one or more predetermined identification signals;

decision means responsive to said comparison means for deciding what file if any is to be transmitted to said user; and an output for outputting a file for tranmission to said user if said decision means decides that said file is to be transmitted.

The present inventors have realised that the HTTP protocol provides that the URL of the HTML file which refers to any image or digitised sound file is included as a 'referrer' address when a request for a file is made to an internet server. Also, the address of the web page is included as a referrer address when a further web page is requested i.e. a further HTML file is requested, using the hypertext links in the web page. Thus, when a file request is made to an internet server, most commercial web browsers e.g. Netscape (trade mark) will comply with the HTTP protocol and will transmit the URL for the web page currently being interpreted by the browser. Thus, the referrer address or URL can be used to identify the route taken in requesting the file from the internet server. This allows the possibility of identifying a first server which is trying to incorporate graphics files from a second server. By interrogating the referrer address, a second server is able to control access to the requested files. This enables the second server to prevent the files being sent. Instead a warning message can be sent, warning that access to the file has been denied. The ability of a second server to identify the originating server allows an operator of a second server to require an operator of a first server to subscribe to allow access to files. The details on the access allowed to the originating server can be stored in a second server to allow the second server to determine at what level access should be allowed to what files.

In addition to the possibility of controlling access to image or sound, or other high bandwidth files, the referrer details transmitted with the file request may inform the server of the web page from which a file request is being made. Thus, if a HTML file is requested from a web page, the server is able to identify from which web page the HTML file request is made and customise the HTML file accordingly. For instance, if the browser requests a HTML file and generates a web page which includes details of a company, the details which are to be displayed can be tailored in dependence upon the current web page being displayed by the browser which could for instance be financial information. The HTML file then transmitted to the browser could be selected from amongst a library of HTML files or specifically generated or tailored to suit the originating web page.

BRIEF DESCRIPTION OF THE DRAWINGS

Embodiments of the present invention will now be described by way of example only with reference to the accompanying drawings in which.

BRIEF DESCRIPTION OF EXEMPLARY EMBODIMENTS

Figure 3:
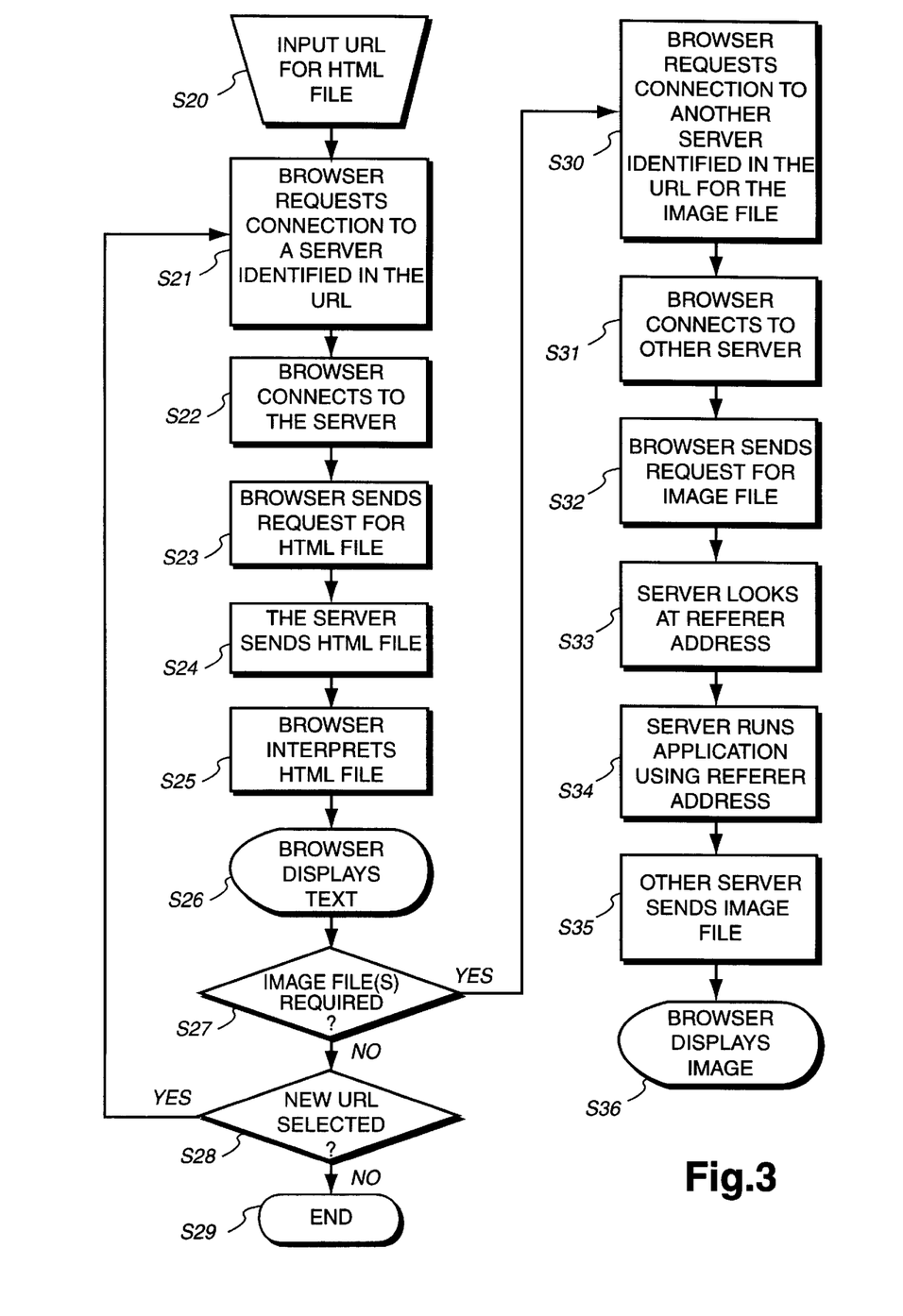
FIG. 3 is a flow diagram illustrating the operation of the browser and servers according to one method of the present invention.

FIG. 3 illustrates one general method in accordance with the present invention. In step S20 a URL or a HTML file is input or selected by a user from the browser. The browser then requests connection to a server identified in the URL in step S21 and in step S22 the browser connects to the server. The browser then sends a request for the HTML file in step S23 and the server sends the HTML file in step S24. The browser then interprets the HTML file in step S25 and displays the web page in step S26. At this point the web page will include only the text and hypertext links. In step S27 it is then determined whether the HTML file refers to any URL's for image files or sound files in step S27. If no files are referred to by the HTML file i.e the web page contains purely text, the browser will determine whether there is a new URL selected in step S28 either manually or via a hypertext link. If a new URL is selected the browser returns to step S21 to request connection to a server. If no new URL is selected the browser will end requesting files in step S29.

If in step S27 it is determined that the HTML file refers to a URL for one or more image files, in step S30 the browser requests connection to another server or servers identified in the URL for the image file. The browser then connects to the other server (or servers) in step S31 and in step S32 the browser sends a request for the image file. In the HTTP protocol, the request for a file includes referrer details which is the URL of the HTML file from which the request originated. In step S33 the server looks at this referrer address and decides what file to send to the browser using the referrer address in step S34. Once the server has decided what file to send to the browser in step S35 the server sends the image file which is then displayed in the web page by the browser in step S36. Steps S27 and S30 to S36 are carried out with one or more servers to acquire all of the image files necessary in order to complete the web page.

Figure 4:
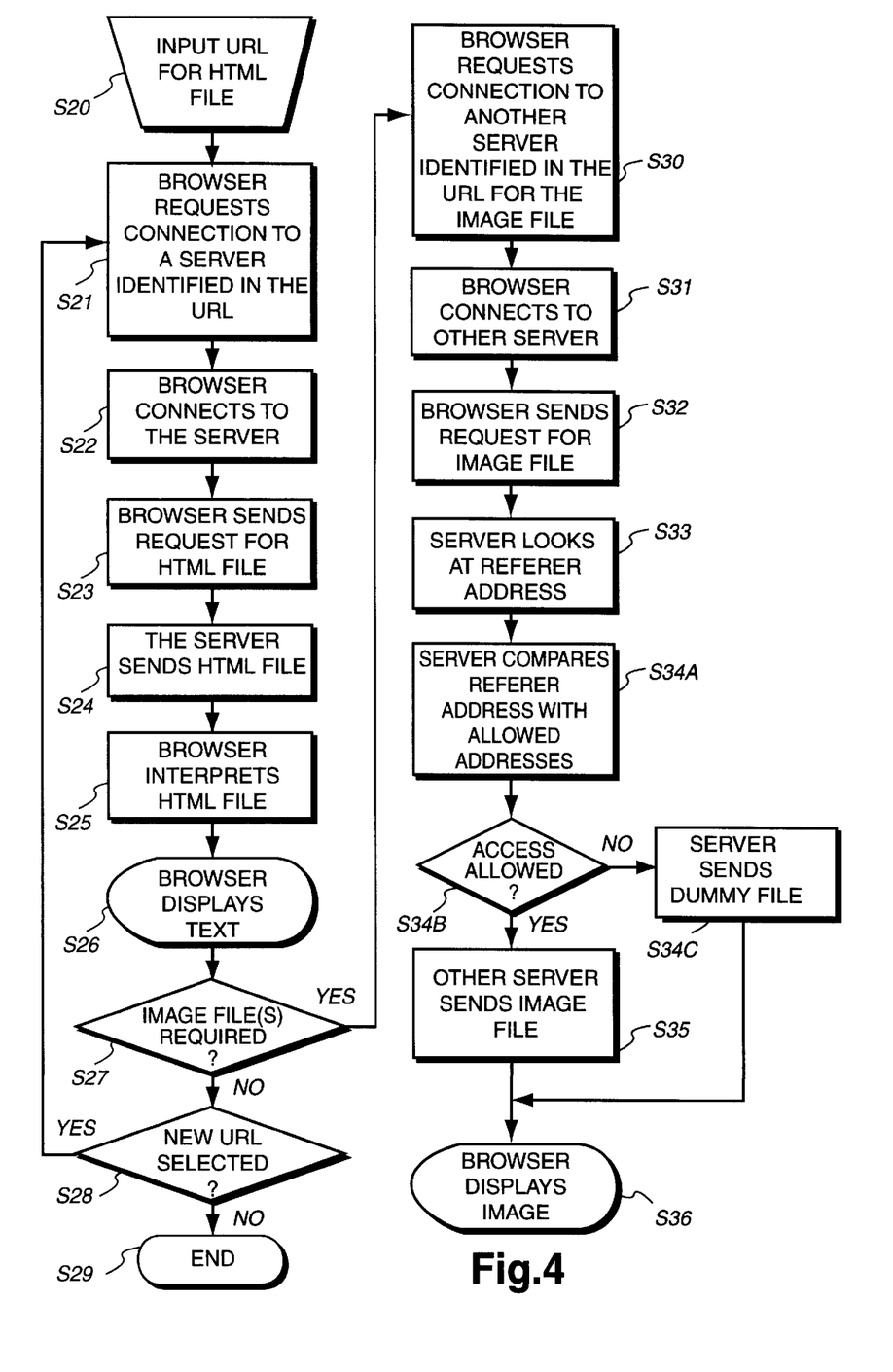
FIG. 4 is a flow diagram illustrating in more detail the operation of the browser and the servers over the internet in accordance with a first embodiment of the present invention.

Thus in this method a web page refers to image files in another server for completing the web page displayed by the browser. Since the HTTP protocol provides for the transmission of the URL of the HTML file currently being interpreted by the browser, the server which receives the request for the image file can determine the origin of the request i.e. which is the originating server, and can thus decide whether access to the image file is allowed. This is shown in more detail in FIG. 4 where like steps are given like reference numerals. In FIG. 4 step S34 is shown in more detail by steps S34A, S34B and S34C. In step S34A the server compares the referrer address with the allowed addresses i.e. the server stores a table of server addresses identifying the files which the servers are allowed access to. In step S34B it is determined whether access is allowed or not. If access is allowed in step S35 the server sends the requested image file. If however in step S34B it is determined that access is not allowed, then the server will send a dummy file for display by the web page in step S34C. Such a dummy file can include a warning that access to the requested image file has not been allowed. Alternatively, if the file is a sound file, instead of the requested digitized sound, a sound file tranmitted could include a simple audio warning or statement that access to the requested file has been denied. A benefit of transmitting a dummy file instead of the requested file is that the size of the dummy file can be considerably smaller than the size of the requested file e.g. 1 Kbyte as opposed to 10's to 100's of Kbytes. This provides a bandwidth saving for the server.

In this way, a server is able to control access to its files over the internet. If a server is accessed directly e.g. by typing in a URL, then there will be no referrer address sent. In this case, the server can recognise that no referrer address has been sent and allow a predetermined level of access to files. For instance, a URL which has been directly entered could be a URL for an image file i.e. the user is attempting to directly down load an image file from the server. It can thus be predetermined whether such direct access is allowed by setting the level of access to files for file requests which do not have a referrer address associated with them.

The ability of a server containing image files, which can either be directly accessed or referred to by other servers, to identify the origin of the request for a file allows the server to provide a subscription service for access to files. The server can be segregated into areas that provide images for any subscriber, one particular subscriber only, subscribers paying for enhanced package, or anyone i.e. a free service. This control will also be beneficial to server owners who refer to other servers for files since owners of the servers containing the files would be encouraged to develop the library of files available to subscribers. Not all server owners would therefore need to generate their own library but can simply subscribe to the servers containing the desired files thereby gaining access to a large range of images, movies and sounds etc which can be incorporated into their web pages. This system also provides a platform for providing copyright protected images and sounds allowing authors or artists payment for their work. Further, the distribution of services over the internet in this manner allows for the efficient use of the internet since the server providing the files to a referrer can be connected to the internet over a high bandwidth connection thus allowing other servers to be connected over low bandwidth connections. This makes efficient use of internet connections and avoids bottlenecks.

Figure 5:
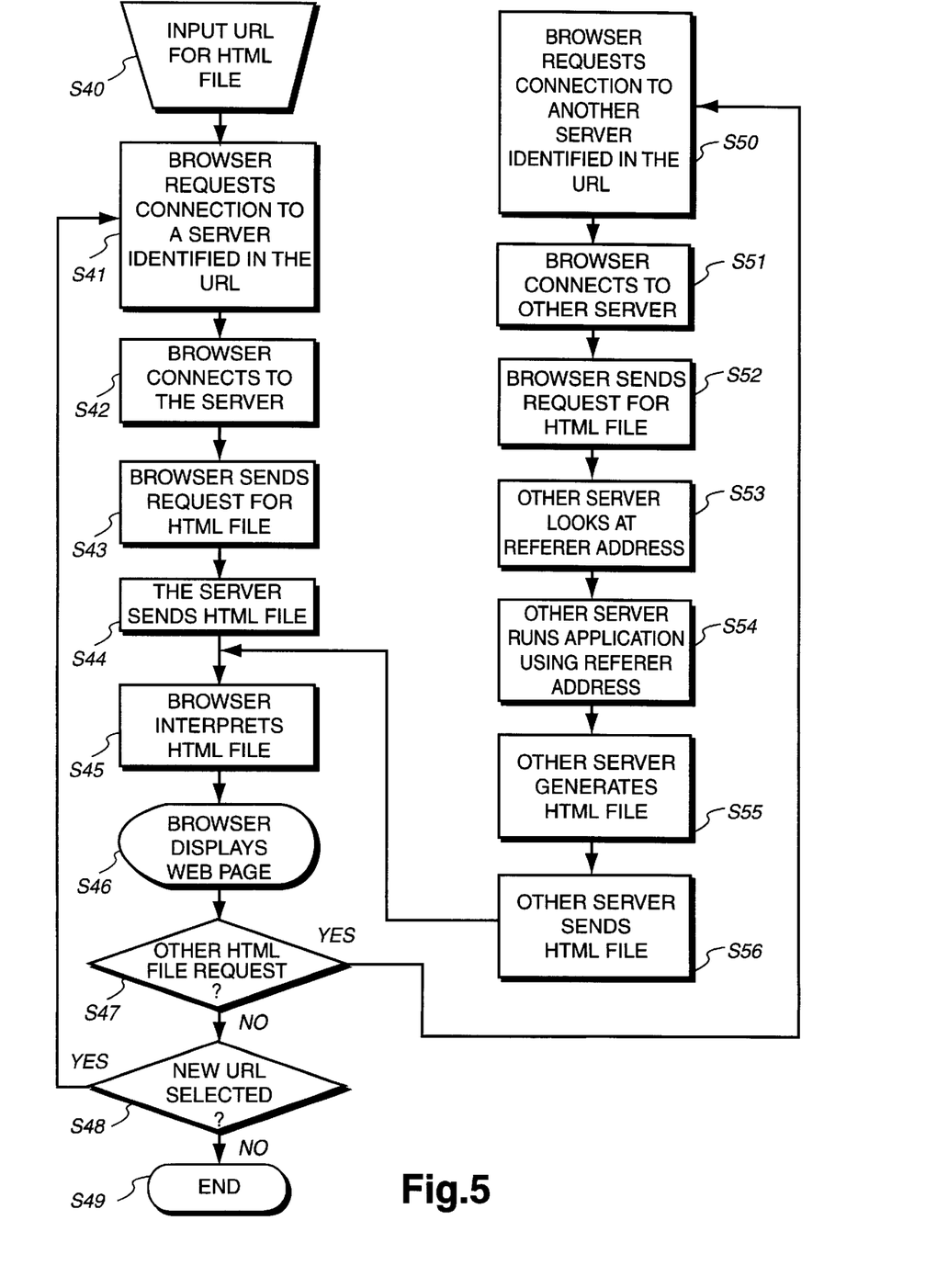
FIG. 5 is a flow diagram illustrating the operation of the browser and the servers over the internet in accordance with a second embodiment of the present invention.

Referring now to FIG. 5, a second method is illustrated allowing the customisation of web pages depending on the route by which the web page is arrived at.

In FIG. 5 in step S40 the URL for the HTML file is input or selected by the user via the browser. The browser then requests connection to a server identified in the URL in step S41 and the browser connects to the server in step S42. The browser sends a request for the HTML file in step S43 and the server sends the HTML file in step S44. The browser then interprets the HTML file in step S45 and in step S46 the browser displays the web page. The web page displayed in step S46 will include text and hypertext links. Also, images can be included in the web page and can be retrieved from a server in a manner described hereinabove with reference to either the prior art FIG. 2, or FIGS. 3 or 4.

In step S47 it is determined whether another HTML file is requested by a user who has selected a hypertext link in the web page. If another HTML file is requested, the HTML file has a URL and in step S50 the browser requests connection to another server identified in the URL. The browser then connects to the other server in step S51 and in step S52 the browser sends a request for the HTML file. The server then looks at the referrer address which refers to the URL of the HTML file which is currently being displayed by the web page (step S46) and the server runs an application using the referrer address in step S54 and in step S55 the server generates a HTML file which is then sent in step S56 to the browser. The browser can then interpret the HTML file in step S45 and display a new web page in step S46.

In this method, since the server refers to the referrer address to determine which application to run, the HTML file sent to the browser can be customised in dependence upon the web page from which the request for a new web page was made. In this embodiment the server runs an application which takes in the referrer address and generates a new HTML file. However, an alternative method of sending a customised HTML file to the browser is illustrated in FIG. 6.

Figure 6:
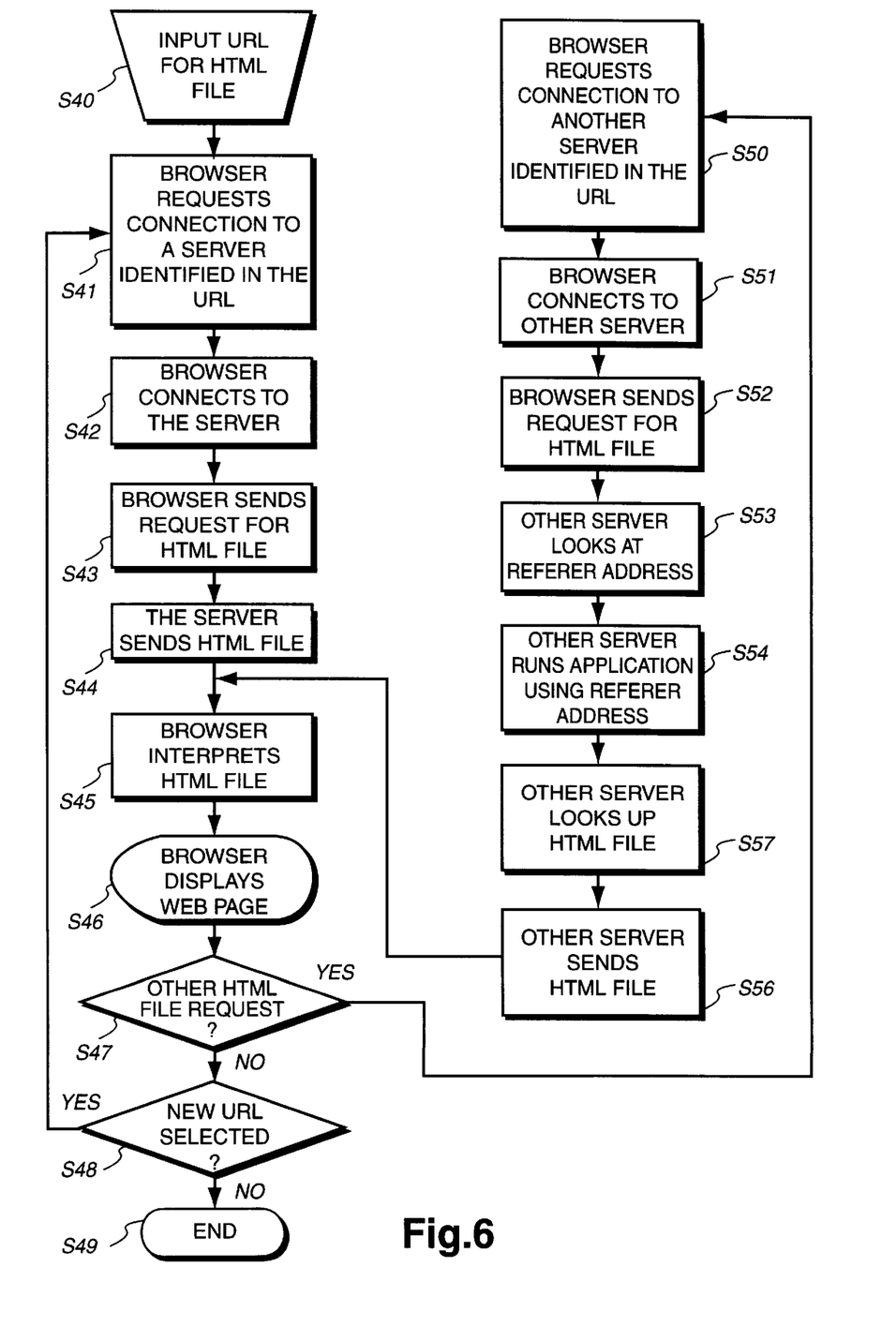
FIG. 6 is a flow diagram illustrating a further method of operating the browser and servers over the internet in accordance with a third embodiment of the present invention.

In FIG. 6 like reference numerals are used for the steps which are the same as those in FIG. 5. This method differs from FIG. 5 in that step S55 i.e. the generation of an HTML file is replaced with a step S57 of looking up an appropriate HTML file from a library of stored HTML files for referrer addresses.

Thus, the methods of FIGS. 5 and 6 allow a server to customise the web page displayed at a browser in dependence upon the previous web page. This would give the server an appearance of having some 'intelligence'.

Figure 7:
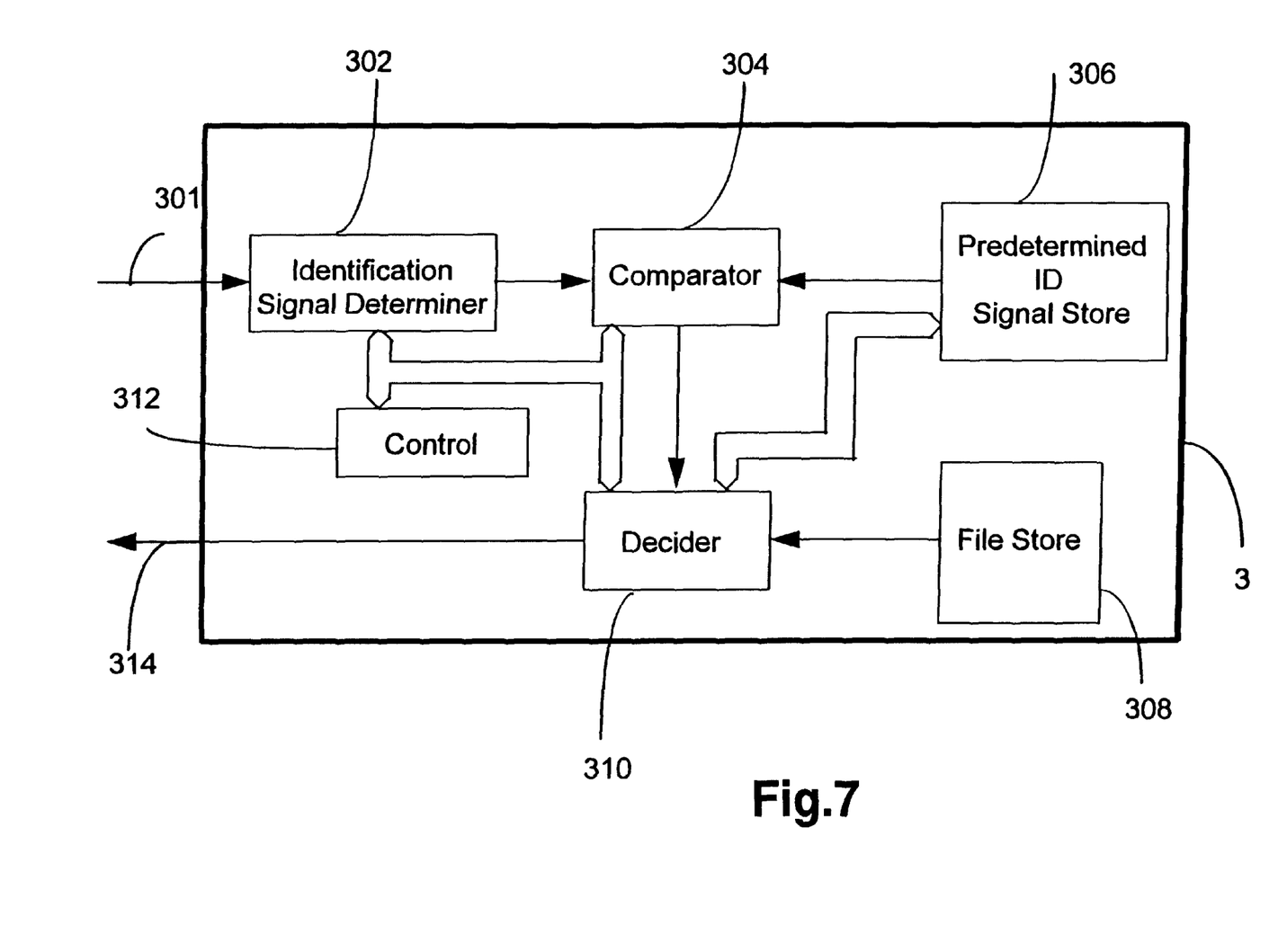
FIG. 7 shows a function block diagram of an intermet server according to one embodiment of the invention.

FIG. 7 shows an internet server 3 according to the invention. The internet server 3 has an input 301 for receiving via the internet a file request from a user, for instance by means of a browser 1. The file request is passed to an identification signal determiner 302 which determines if the file request includes an identification signal identifying the origin of the file request. For instance, if the file request conforms to the hypertext transfer protocol, the file request may include the URL of the page being displayed on the user's screen. This URL is the identification signal determined by the unit 302.

A comparator 304 then compares the identified identification signal in the input file request with predetermined identification signals stored in a store 306. Whether or not there is a match will determine which file stored in the file store 308 is transmitted to the user. The comparator 304 and the decision means 310 are controlled by a control unit 312. The comparator 301 informs the decision means 310 of the result of the comparison. The decision means 310 then interrogates the store 206 to determine to which files access allowed. If access to the requested file is allowed, the file is retrieved from the file store 308 and then transmitted to the user via an output 314 and the internet. The control of the decision means 310 has been described at length with reference to FIGS. 3 to 6.

The functional elements of the internet server may be implemented in hardware or software or a combination of both.

Although the present invention has been described with reference to specific embodiments, the present invention is not so limited and modifications which are clear to a skilled person in the art can be made without departing from the scope of the invention. In particular, the term "internet" is used generically and refers not only to an international interconnected network of computers and servers but also to other interconnected networks, for instance so-called intranets—interconnected networks internal to an organisation. Furthermore, the term "web" is not intended to limit implementation of the invention to WWW applications. The invention may also be applicable to FTP (File Transfer Protocol) and Telnet applications and other such future applications. This list is not intended to be exhaustive.

What is claimed is:

1. A method of operating a file server, said method comprising the steps of:

receiving a request for a file;

determining if the request includes a received identification signal identifying an originating file from which said request originated;

comparing any said received identification signal with one or more predetermined identification signals; and deciding which file, if any, is to be supplied in dependence upon said determining and comparing steps, and if in the deciding step it is decided that a file is to be supplied, supplying said file.

2. A method as in claim 1 wherein said supplied file is supplied only if any said identification signal matches a said predetermined identification signal.

3. A method as in claim 1 wherein said supplied file is the same file as requested.

4. A method as in claim 1 wherein if any said identification signal does not match a said predetermined identification signal, said supplied file is not the same file as requested.

5. A method as in claim 1 including using a look up table which contains said one or more predetermined identification signals and which identifies at least one file which can be supplied in accordance with a predetermined identification signal.

6. A method as in claim 1 wherein said deciding step further comprises generating said supplied file.

7. A method as in claim 1 wherein said request conforms to a hypertext transfer protocol.

8. A method as in claim 7 wherein said received identification signal includes a universal resource location address for said origination from which the request originated.

9. A method as in claim 1 in which said file server is connected to the internet and wherein said request is received via the internet.

10. A file server comprising:

receiving means for receiving a file request;

determining means for determining if the file request includes an identification signal identifying an originating file from which said file request originated;

comparison means for comparing any said identification signal with at least one predetermined identification signals;

decision means responsive to said determining means and to said comparison means for deciding which file, if any, is to be supplied; and an output means for supplying a file if said decision means decides that a file is to be supplied.

11. A file server as in claim 10 wherein said decision means is adapted to decide that a file is to be supplied only if said identification signal matches a predetermined identification signal.

12. A file server as in claim 10 wherein said decision means is adapted to decide that the file requested is to be supplied if said identification signal matches a predetermined identification signal.

13. A file server as in claim 10 wherein if said identification signal does not match a predetermined identification signal, a file other than that which was requested is supplied.

14. A file server as in claim 10 further comprising storage means for storing a look-up table containing said predetermined identification signals, said look-up table identifying at least one file which can be supplied in accordance with a predetermined identification signal.

15. A file server as in claim 10 wherein said deciding means further comprises generating means for generating a file to be supplied.

16. A file server as in claim 10 wherein the receiving means is adapted to receive file requests conforming to a hypertext transfer protocol.

17. A file server as in claim 16 wherein said identification signal and said predetermined identification signal include a universal resource address location for said originating file from which said file request originated.

18. A file server as in claim 10 in which said file server is connected to the internet and wherein said receiving means is adapted to receive said file request via the internet.

* * * * *

(12) EX PARTE REEXAMINATION CERTIFICATE (10247th)
United States Patent
Antcliff et al.

(10) Number: US 6,081,835 C1
(45) Certificate Issued: Aug. 7, 2014

(54) INTERNET SERVER AND METHOD OF CONTROLLING AN INTERNET SERVER

(75) Inventors: Stuart J. Antcliff, Suffolk (GB); John C. Regnault, Suffolk (GB); Laurence D. Bradley, Suffolk (GB)

(73) Assignee: Suffolk Technologies, LLC, Bridgewater, NJ (US)

Reexamination Request:
No. 90/012,714, Oct. 30, 2012

Reexamination Certificate for:
| | |
|---|---|
| Patent No.: | 6,081,835 |
| Issued: | Jun. 27, 2000 |
| Appl. No.: | 08/815,468 |
| Filed: | Mar. 11, 1997 |

Related U.S. Application Data (63) Continuation-in-part of application No. 08/684,257, filed on Jul. 19, 1996, now abandoned.

(30) Foreign Application Priority Data

Apr. 4, 1996 (GB) ...................................... 9607152

(51) Int. Cl.
*G06F 15/16* (2006.01)

(52) U.S. Cl.
USPC .......................................... 709/217; 709/229

(58) Field of Classification Search
None
See application file for complete search history.

(56) References Cited

To view the complete listing of prior art documents cited during the proceeding for Reexamination Control Number 90/012,714, please refer to the USPTO's public Patent Application Information Retrieval (PAIR) system under the Display References tab.

*Primary Examiner* — Nick Corsaro (57) ABSTRACT

An internet server is controlled wherein the server receives a hypertext transfer protocol file request from a web browser over the internet and any identification signal included with the hypertext transfer protocol file request. The identification signal is compared with one or more predetermined identification signals and depending upon the result of the comparison a file may be transmitted from the server to the web browser.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-9 is confirmed.

Claims 10-18 are cancelled.

New claims 19-27 are added and determined to be patentable.

19. *The method of claim 6, wherein said originating file is a current web page being displayed by a browser and said supplied file is generated in dependence upon said current web page being displayed by the browser.*

20. *The method of claim 6, wherein said originating file is an originating web page and said supplied file is generated to suit said originating web page.*

21. *A method of operating a file server, the method comprising the steps of:*
    *receiving, by the file server, a request for a file;*
    *determining, by the file server, if the request includes a received identification signal identifying an originating file from which the request originated;*
    *comparing, by the file server, any received identification signal with one or more predetermined identification signals; and*
    *deciding, by the file server, which file, if any, is to be supplied in dependence upon the determining and comparing steps, and if in the deciding step it is decided that a customized file is the file to be supplied:*
    *generating, by the file server, the customized file; and*
    *supplying, by the file server, the customized file.*

22. *The method of claim 21, wherein the originating file is a current web page being displayed by a browser and the customized file is generated in dependence upon the current web page being displayed by the browser.*

23. *The method of claim 21, wherein the originating file is an originating web page and the customized file is generated to suit the originating webpage.*

24. *The method of claim 21, wherein the customized file is configured to be displayed within the originating file.*

25. *The method of claim 21, wherein the originating file is an originating webpage.*

26. *The method of claim 25, wherein the customized file is configured to be displayed within the originating webpage.*

27. *A file server comprising:*
    *an input configured to receive a file request;*
    *a processor configured to determine if the file request includes an identification signal identifying an originating file from which said file request originated;*
    *the processor further configured to compare any said identification signal with at least one predetermined identification signals;*
    *the processor further configured to decide, responsive to the determination and comparison by the processor, which file, if any, is to be supplied;*
    *the processor further configured to generate a customized file, when the processor has determined that a customized file is the file to be supplied; and*
    *an output configured to supply the customized file.*

* * * * *